US007157188B2

(12) United States Patent
Yamaguchi et al.

(10) Patent No.: US 7,157,188 B2
(45) Date of Patent: Jan. 2, 2007

(54) BATTERY

(75) Inventors: Akira Yamaguchi, Fukushima (JP); Kei Yonezawa, Tokyo (JP)

(73) Assignee: Sony Corporation, Tokyo (JP)

( * ) Notice: Subject to any disclaimer, the term of this patent is extended or adjusted under 35 U.S.C. 154(b) by 322 days.

(21) Appl. No.: 10/791,394

(22) Filed: Mar. 2, 2004

(65) Prior Publication Data

US 2004/0234866 A1 Nov. 25, 2004

(30) Foreign Application Priority Data

Mar. 3, 2003 (JP) .......................... P2003-056256

(51) Int. Cl.
*H00M 6/16* (2006.01)

(52) U.S. Cl. ...................................... 429/326; 429/342

(58) Field of Classification Search ................ 429/326, 429/342
See application file for complete search history.

(56) References Cited

U.S. PATENT DOCUMENTS 5,601,950 A * 2/1997 Yamahira et al. ........ 429/231.8
6,509,123 B1 * 1/2003 Shibuya et al. ............. 429/303

* cited by examiner

*Primary Examiner*—Patrick Joseph Ryan
*Assistant Examiner*—Thomas H. Parsons
(74) *Attorney, Agent, or Firm*—Sonnenschein Nath & Rosenthal LLP

(57) ABSTRACT

A battery wherein a cathode and an anode are layered and wound with a separator and an electrolyte in between them. The electrolyte is formed by firstly forming a coating layer containing a high molecular weight compound, a high viscosity solvent having a boiling point of more than 150° C., and an electrolyte salt on the cathode and the anode, and then injecting an injection solution containing a low viscosity solvent having a boiling point of 150° C., or less in the coating layer. A concentration of the low viscosity solvent in the electrolyte changes in the facing direction of the cathode and the anode. The concentration of the low viscosity solvent in the electrolyte is higher between the cathode and the anode, than on the cathode side and the anode side. Therefore, a diffusion rate of lithium ions is raised, and overvoltage is reduced.

13 Claims, 7 Drawing Sheets

20
II
12
31
32
II
11

BATTERY

RELATED APPLICATION DATA

The present application claims priority to Japanese Application(s) No(s). P2003-056256 filed Mar. 3, 2003, which application(s) is/are incorporated herein by reference to the extent permitted by law.

BACKGROUND OF THE INVENTION

1. Field of the Invention

The present invention relates to a battery comprising a cathode, an anode, and an electrolyte.

2. Description of the Related Art

In recent years, many portable electronic devices such as a combination VTR (video tape recorder), a mobile phone, and a mobile computer have been introduced. Downsizing and weight saving of these devices have been made. Along with these situations, as a portable power source for the electronic devices, a battery, particularly a secondary battery has been actively researched and developed. Specially, a lithium ion secondary battery provides a higher energy density compared to conventional lead batteries or nickel cadmium batteries do. Therefore, the lithium ion secondary battery is highly prospective.

Historically, a general lithium ion secondary battery has been the battery, wherein an electrolytic solution, the liquid electrolyte is used, and a metal container is used as an exterior member to prevent solution leak. However, when using the metal container for an exterior member, it is very hard to fabricate, for example, a sheet-type battery having a thin thickness and a large area, a card-type battery having a thin thickness and a small area, and a flexible battery having more freedom of shape.

Therefore, it has been considered to fabricate a battery by using a total solid electrolyte such as an inorganic solid electrolyte and an organic high molecular weight electrolyte, or a semisolid electrolyte such as a gelatinous electrolyte, wherein an electrolytic solution is held in a high molecular weight compound (for example, refer to Japanese Unexamined Patent Application Publication No. 2001-167797).

When using these solid electrolytes, there is no danger of leak, and a thickness can be fixed. In addition adhesion properties to the electrodes are excellent, so that contact with the electrodes can be maintained. Therefore, when using the solid electrolyte, there is no need to use the metal container for an exterior member, a dampproof laminated film and so on wherein a metal foil is sandwiched between a high molecular weight compound having heat anastomoses properties can be used, and a sealing structure of the battery can be easily realized by thermocompression and the like. Further, the dampproof laminated film and the like have a high strength and an excellent airtightness. In addition, they are light-weight, thin, and inexpensive compared to the metal container. Therefore, by using the dampproof laminated film and the like, light and thin batteries can be fabricated inexpensively.

The battery using the solid electrolyte is mainly used for notebook personal computers and mobile phones. Recently, the notebook personal computer mounts a high performance CPU (Central Processing Unit), and the mobile phone mounts a camera. Therefore, the notebook personal computer and the mobile phone with a camera need a large load current. Further, since the mobile phone with a camera is used in ski resorts and the like more excellent low temperature characteristics are required. Therefore, improvement in both high load characteristics and low temperature characteristics is required for batteries.

SUMMARY OF THE INVENTION

The invention has been achieved in consideration of such problems, and it is an object of the invention to provide a battery having both excellent high load characteristics and excellent low temperature characteristics.

A first battery according to the invention comprises a cathode, an anode, and an electrolyte. The electrolyte contains a high molecular weight compound, a solvent containing a high viscosity solvent whose boiling point is more than 150° C. and a low viscosity solvent whose boiling point is 150° C. or less, and an electrolyte salt. The electrolyte is formed by firstly forming coating layer containing the high molecular weight compound, the high viscosity solvent, and the electrolyte salt on the cathode and the anode, and then injecting an injection solution containing the low viscosity solvent in the coating layer.

A second battery according to the invention is a battery, wherein a cathode and an anode are faced with an electrolyte in between. The electrolyte contains a high molecular weight compound, a solvent containing a high viscosity solvent whose boiling point is more than 150° C. and a low viscosity solvent whose boiling point is 150° C. or less, and an electrolyte salt. A concentration of the low viscosity solvent in the electrolyte changes in the facing direction of the cathode and the anode. The concentration of the low viscosity solvent in the electrolyte is higher between the cathode and the anode, compared to on the cathode side and the anode side.

In the first and the second batteries according to the invention, a diffusion rate of ions generated by dissociation of the electrolyte salt can be improved. In addition, both excellent high load characteristics and excellent low temperature characteristics can be obtained.

Other and further objects, features and advantages of the invention will appear more fully from the following description.

DETAILED DESCRIPTION OF THE PREFERRED EMBODIMENT

An embodiment of the invention will be described in detail hereinbelow with reference to the drawings.

Figure 1:
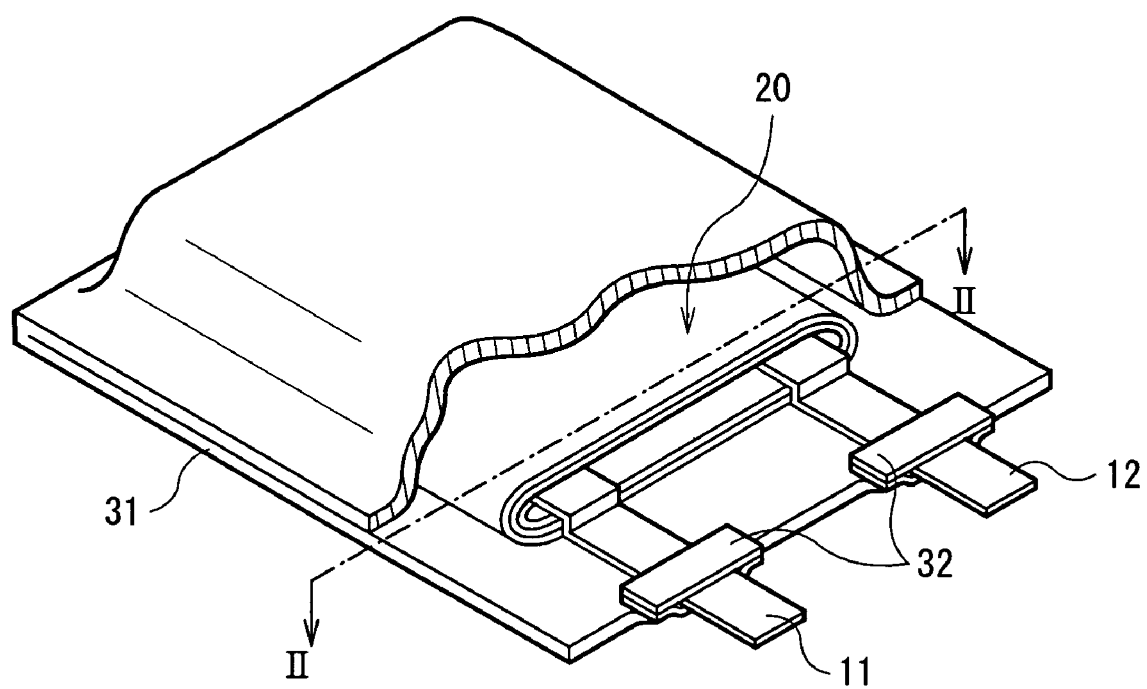
FIG. 1 is an oblique perspective figure which shows a construction of a secondary battery manufactured by using a manufacturing method for a secondary battery according to an embodiment of the invention.

FIG. 1 shows an exploded view showing a construction of a secondary battery according to the embodiment of the invention. This secondary battery has a construction, wherein a battery device 20 on which a cathode lead 11 and an anode lead 12 are attached is housed inside of a film exterior member 31.

The cathode lead 11 and the anode lead 12 are directed from inside to outside of the exterior member 31, and, for example, are derived in the same direction respectively. The cathode lead 11 and the anode lead 12 are respectively made of a metal material such as aluminum (Al), copper (Cu), nickel (Ni), and stainless, and are respectively in the shape of a thin plate or in the shape of a net.

The exterior member 31 is made of an aluminum laminated film in the shape of a rectangle, wherein, for example, a nylon film, an aluminum foil, and a polyethylene film are bonded together in this order. The exterior member 31 is, for example, arranged so that its polyethylene film side and the battery device 20 are faced, and respective outer edge parts are fusion bonded or adhered to each other by adhesive. Adhesive films 32 to protect from outside air intrusion are inserted between the exterior member 31 and the cathode lead 11, and the exterior member 31 and the anode lead 12. The adhesive film 32 is made of a material having contact properties to the cathode lead 11 and the anode lead 12. For example, when the cathode lead 11 and the anode lead 12 are made of the foregoing metal material, the adhesive film 32 is preferably made of a polyolefin resin such as polyethylene, polypropylene, modified polyethylene, and modified polypropylene.

The exterior member 31 can be made of a laminated film having other structure, a high molecular weight film such as polypropylene, or a metal film, instead of the foregoing aluminum laminated film.

Figure 2:
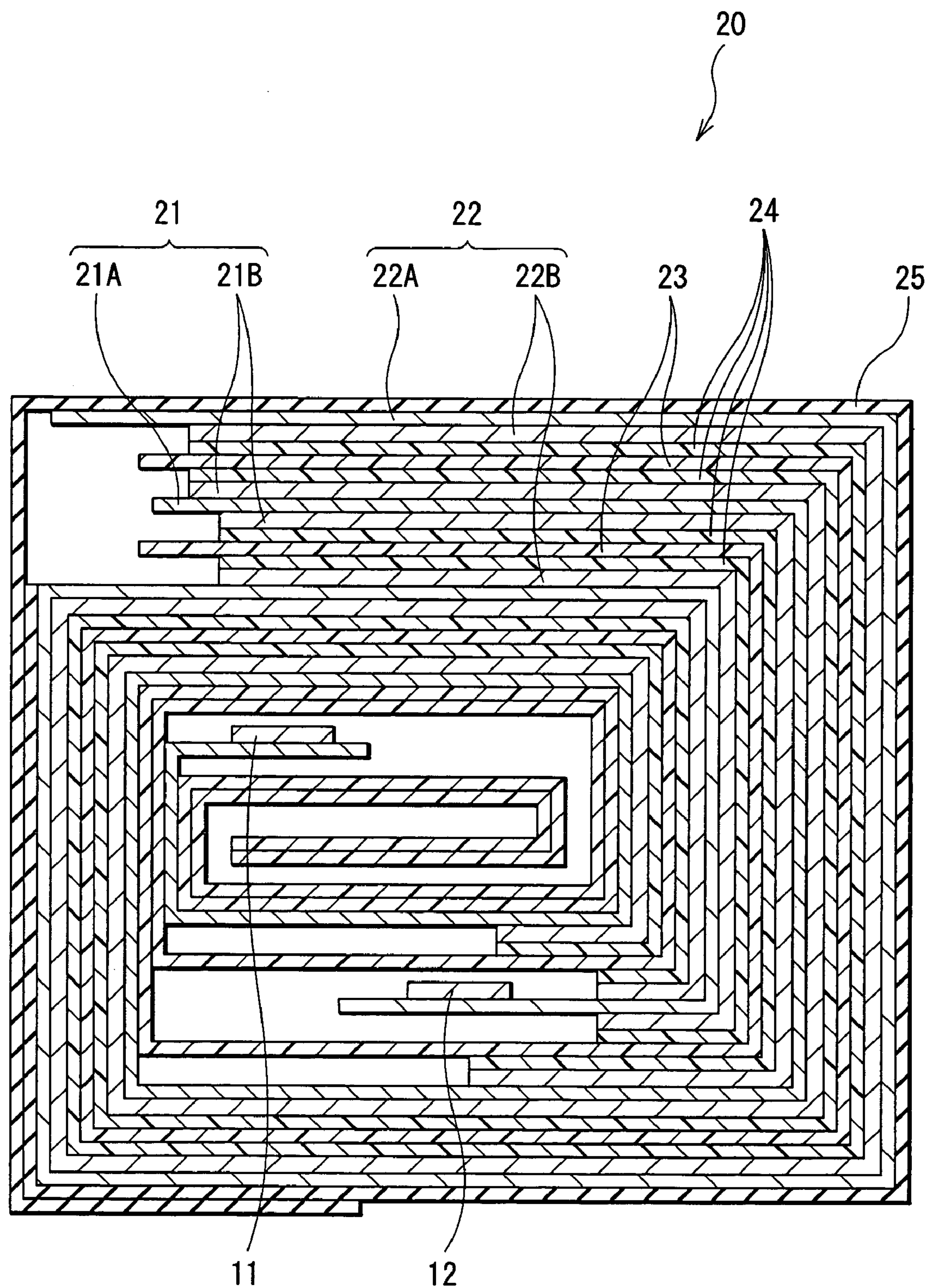
FIG. 2 is a cross sectional view which shows a construction taken along line II—II of a battery device illustrated in FIG. 1.

FIG. 2 is a view showing a cross sectional structure taken along line II—II of the battery device 20 illustrated in FIG. 1. The battery 20 is formed by layering and winding a cathode 21 and an anode 22 with a separator 23 and an electrolyte 24 in between. An outermost part of the battery device 20 is protected by a protective tape 25.

The cathode 21 comprises, for example, a cathode current collector 21A and cathode mixture layer 21B provided on both sides or on a single side of the cathode current collector 21A. At one end of the cathode current collector 21A in the longitudinal direction, there is an exposed part on which no cathode mixture layer 21B is provided. The cathode lead 11 is attached on this exposed part. The cathode current collector 21A is made of, for example, a metal foil such as an aluminum foil, a nickel foil, and a stainless foil.

The cathode mixture layer 21B contains, for example, a cathode active material. The cathode mixture layer 21B can contain a conductive agent such as graphite and a binder such as poly (vinylidene fluoride) as necessary. As a cathode active material, for example, lithium complex oxides expressed as a general formula of $Li_xMIO_2$ or interlayer compounds containing lithium are preferable, since energy density can be improved. In the foregoing general formula, MI represents at least one from the group consisting of cobalt (Co), nickel (Ni), manganese (Mn), iron (Fe), aluminum, vanadium (V), and titanium (Ti). x varies according to charge/discharge conditions of the battery, and normally is a value in the range of $0.05 \leqq x \leqq 1.10$. Concrete examples of such lithium complex oxides and the like include $LiCoO_2$, $LiNiO_2$, $Li_yNi_zCo_{1-z}O_2$ (y and z vary according to charge/discharge conditions of the battery. Values of y and z are generally in the range of $0<y<1$ and $0.7<z<1.02$), and $LiMn_2O_4$. In addition, lithium phosphate compounds such as $LiMIIPO_4$ (MII represents one or more transition metals) having an olivine type crystal structure are also preferable, since high energy density can be obtained. As a cathode active material, one or more of the above can be used.

As the cathode 21 does, the anode 22 comprises, for example, an anode current collector 22A and anode mixture layer 22B provided on both sides or on a single side of this anode current collector 22A. At one end of the anode current collector 22A in the longitudinal direction, there is an exposed part on which no anode mixture layer 22B is provided. The anode lead 12 is attached on this exposed part. The anode current collector 22A is made of, for example, a metal foil such as a copper foil, a nickel foil, and a stainless foil.

The anode mixture layer 22B contains, for example, an anode active material and, as necessary, can also contain a binder such as poly (vinylidene fluoride). A volume density of this anode mixture layer 22B is preferably from 1.0 $g/cm^3$ to 2.2 $g/cm^3$, and more preferably from 1.2 $g/cm^3$ to 2.0 $g/cm^3$. An average void diameter of the anode mixture layer 22B is preferably from 0.2 μm to 5 μm, and more preferably from 0.5 μm to 4 μm. When a volume density is high and an average void diameter is small, permeability of after-mentioned solvents to the anode mixture layer 22B is low. In addition, solvent composition in the anode mixture layer 22B becomes uneven when using a mixed solvent. Meanwhile, when the volume density is low and the average void diameter is large, contact properties between the anode active material are low, and electrode reaction is hard to proceed.

As an anode active material, materials which insert and extract lithium in relation to lithium metals electrochemically at a potential of 2.0 V or less are preferable. Concrete examples of such materials include carbonaceous materials such as non-graphitizable carbon, artificial graphite, natural graphite, cokes, graphites, glassy carbons, organic high molecular weight compound firing body, carbon fiber, activated carbon, and carbon blacks. In the above, cokes include pitch coke, needle coke, and petroleum coke. The organic high molecular weight compound firing body means one which is carbonized by firing a high molecular weight material such as phenols and furans at appropriate temperatures.

Examples of materials which insert and extract lithium include simple substances, alloys, and compounds of metal elements or metalloid elements which can form an alloy with lithium. These materials are preferable since they can provide high energy density. In particular, it is more preferable to use any of these materials together with a carbon material since high energy density and excellent cycle characteristics can be obtained. In the specification, alloys include alloys consisting of two or more metal elements and, in addition, alloys consisting of one or more metal elements and one or more metalloid elements. Structures of the materials include a solid solution structure, a eutectic (eutectic mixture) structure, an intermetallic compound structure, and a concomitant state comprised of two or more of the foregoing structures.

Examples of such metal elements or metalloid elements include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Examples of alloys or compounds thereof include ones which are expressed by a chemical formula of $Ma_sMb_tLi_u$ or $Ma_pMc_qMd_r$. In these chemical formulas, Ma represents at least one of metal elements and metalloid elements capable of forming an alloy with lithium, Mb represents at least one of metal elements and metalloid elements other than lithium and Ma, Mc represents at least one of nonmetallic elements, and Md represents at least one of metal elements and metalloid elements other than Ma. Values of s, t, u, p, q, and r satisfy $s>0$, $t\geqq 0$, $u\geqq 0$, $p>0$, $q>0$, and $r\geqq 0$, respectively.

Specially, simple substances, alloys, or compounds of metal elements or metalloid elements in Group 4B in the short period periodic table are preferable. Silicon and tin, or their alloys and compounds are particularly preferable. These materials can be crystalline or amorphous ones.

Concrete examples of such alloys and compounds include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leqq 2$), $SnO_w$ ($0<w\leqq 2$), $SnSiO_3$, LiSiO, and LiSnO.

Further examples of materials capable of inserting and extracting lithium include other metal compounds such as iron oxide, ruthenium oxide, molybdenum oxide, tungstic oxide, and titanium oxide.

The separator 23 is constructed of, for example, a porous film made of a synthetic resin such as polytetrafluoroethylene, polypropylene, and polyethylene, or a porous film made of ceramics. The separator 23 can have a structure in which two or more porous films from the above examples are layered.

The electrolyte 24 is gelatinous, and comprises a high molecular weight compound, a solvent containing a high viscosity solvent whose boiling point is more than 150° C. in the ambient pressure ($1.01325\times 10^5$ Pa) and a low viscosity solvent whose boiling point is 150° C. or less in the ambient pressure, and lithium salt as an electrolyte salt. The electrolyte 24 is, as described later, formed by firstly forming coating layer including the high molecular weight compound, the high viscosity solvent, and the electrolyte salt on the cathode 21 and the anode 22, and then injecting an injection solution containing the low viscosity solvent in the coating layer.

As a high molecular weight compound, any high molecular weight compound which absorbs and gelates the solvent can be accepted. Examples of the high molecular weight compounds include fluoro-high molecular weight compounds such as a copolymer of poly (vinylidene fluoride) or vinylidene fluoride and hexafluoropropylene, ether-high molecular weight compounds such as poly (ethylene oxide) and a cross-linked polymer containing poly (ethylene oxide), and poly (acrylic nitryl). Specially, in the view of redox stability, the fluoro-high molecular weight compounds are desirable.

Examples of the high viscosity solvent include propylene carbonate, ethylene carbonate, vinylene carbonate, γ-butyrolactone, sulfolane, and methylsulfolane.

Examples of the low viscosity solvent include ethyl methyl carbonate, diethyl carbonate, dimethyl carbonate, methyl propyl carbonate, ethyl propyl carbonate, dipropyl carbonate, butyl ethyl carbonate, 1,2-dimethoxy ethane, 1,2-diethoxy ethane, tetrahydrofuran, 2-methyl tetrahydrofuran, 1,3-dioxoran, 4-methyl-1,3-dioxoran, diethyl ether, acetonitrile, propionitrile, ester acetate, ester butyrate, and ester propionate. These low viscosity solvents are intended to accelerate a diffusion rate of lithium ions. A concentration of the low viscosity solvent changes in the facing direction of the cathode 21 and the anode 22. The concentration of the low viscosity solvent is higher between the cathode 21 and the anode 22, compared to on the cathode 21 side and the anode 22 side. When the electrolyte 24 is formed by injecting the low viscosity solvent in the coating layer, the low viscosity solvent is easy to be diffused in the separator 23 compared to on the cathode 21 side and the anode 22 side, since the low viscosity solvent has higher compatibility with the separator 23 than with the high molecular weight compound. In addition, therefore, when the battery is charged and stored under high temperatures, a case wherein the low viscosity solvent is oxidized and decomposed in the cathode 21, and carbon dioxide gas is generated, and the battery is swollen can be prevented.

Examples of the lithium salt include $LiClO_4$, $LiAsF_6$, $LiPF_6$, $LiBF_4$, LiN $(SO_2CF_3)_2$, LiN $(SO_2C_2F_5)_2$, LiB $(C_6H_5)_4$, $CH_3SO_3Li$, $CF_3SO_3Li$, LiCl, and LiBr. Specially, $LiPF_6$ is preferable since a high conductivity can be obtained and its oxidation stability is excellent. $LiBF_4$ is preferable since its thermal stability and oxidation stability are excellent. Further, LiN $(SO_2CF_3)_2$ and LiN $(SO_2C_2F_5)_2$ are preferable since relatively high conductivity can be obtained and their thermal stability is high. For the lithium salt, one of the foregoing examples can be used, and mixture of two or more of the foregoing examples can be used.

A content of the electrolyte salt in relation to the solvent in the electrolyte 24 is preferably from 0.36 mol/kg to 1.52 mol/kg, and more preferably from 0.5 mol/kg to 1.4 mol/kg. Within the range, ion conductivity in the electrolyte 24 can be improved.

The secondary battery having the foregoing construction can be manufactured as follows, for example.

Figure 3A:
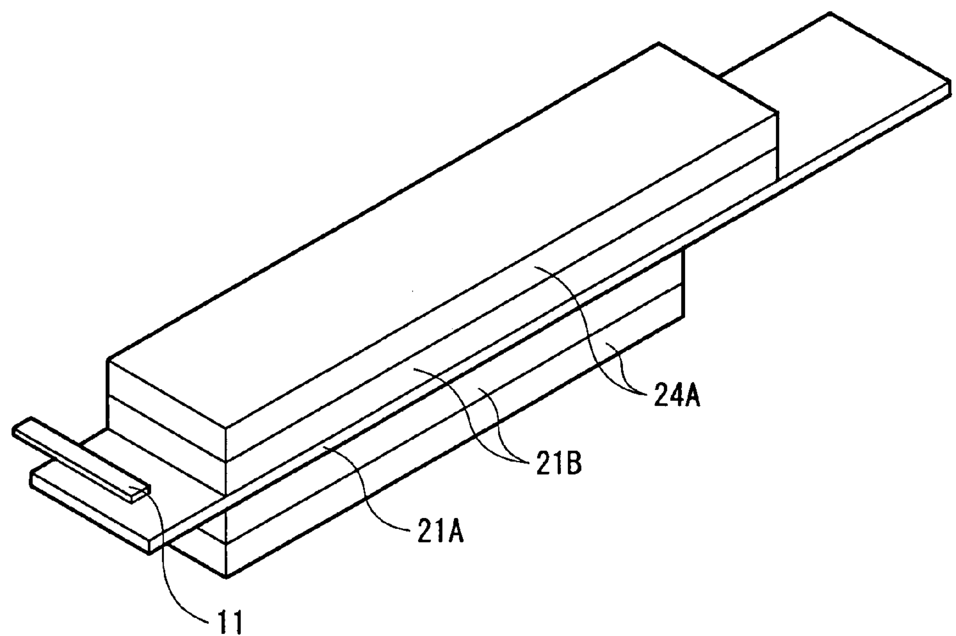
FIGS. 3A and 3B are oblique perspective figures which show manufacturing processes for the secondary battery shown in FIGS. 1 and 2.

FIGS. 3A to 5 show manufacturing processes for the secondary battery according to the embodiment. First, for example, a cathode active material, a conductive agent, and a binder are mixed to prepare a cathode mixture. The cathode mixture is diffused in a solvent such as N-methyl pyrrolidone to obtain a cathode mixture slurry. Next, as shown in FIG. 3A, the cathode mixture slurry is applied to both sides or a single side of the cathode current collector 21A, dried, and compression-molded to form the cathode mixture layer 21B. In result, the cathode 21 is fabricated. Subsequently, for example, the cathode lead 11 is attached on the cathode current collector 21A. After that, a precursor solution containing a high molecular weight compound, a high viscosity solvent, an electrolyte salt, and a solvent of high molecular weight compound is applied to the cathode mixture layer 21B, that is, to both sides or a single side of the cathode 21. The solvent of high molecular weight compound is volatilized to form coating layer 24A. As the solvent of high molecular weight compound, for example, ethyl methyl carbonate or N-methyl pyrrolidone is used. It is preferable that a low viscosity solvent is not contained in the coating layer 24A.

Figure 3B:
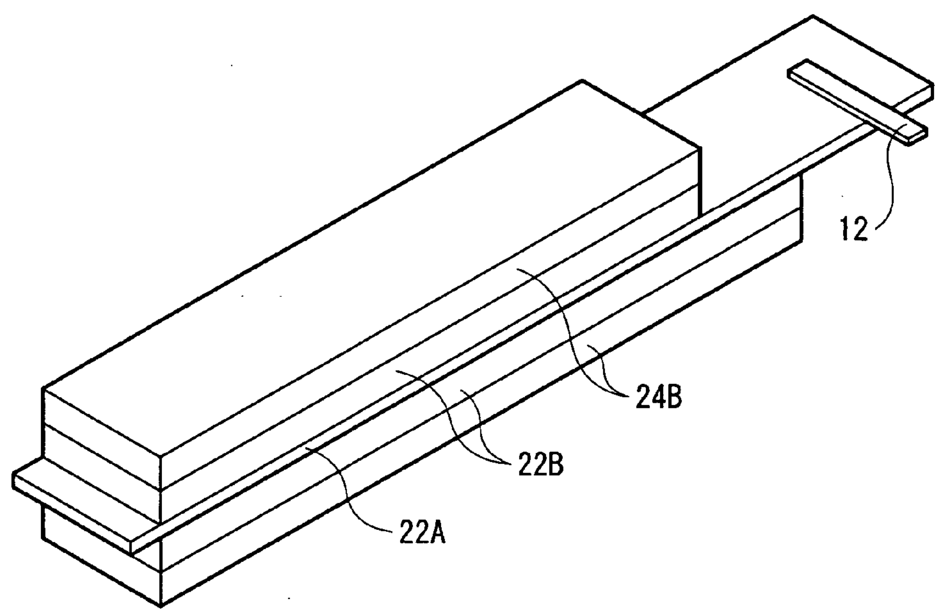

For example, an anode active material and a binder are mixed to prepare an anode mixture. The anode mixture is diffused in a solvent such as N-methyl pyrrolidone to obtain an anode mixture slurry. Next, as shown in FIG. 3B, the anode mixture slurry is, for example, applied to both sides or a single side of the anode current collector 22A, dried, and compression-molded to form the anode mixture layer 22B. In result, the anode 22 is fabricated. In this regard, it is preferable that a volume density and an average void diameter of the anode mixture layer 22B are in the foregoing given ranges. Subsequently, the anode lead 12 is attached on the anode current collector 22A. Then, a coating layer 24B are formed on the anode mixture layer 22B, that is on both sides or a single side of the anode 22, in a manner similar to the coating layer 24A. It is preferable that a low viscosity solvent is not contained in the coating layer 24B.

Figure 4:
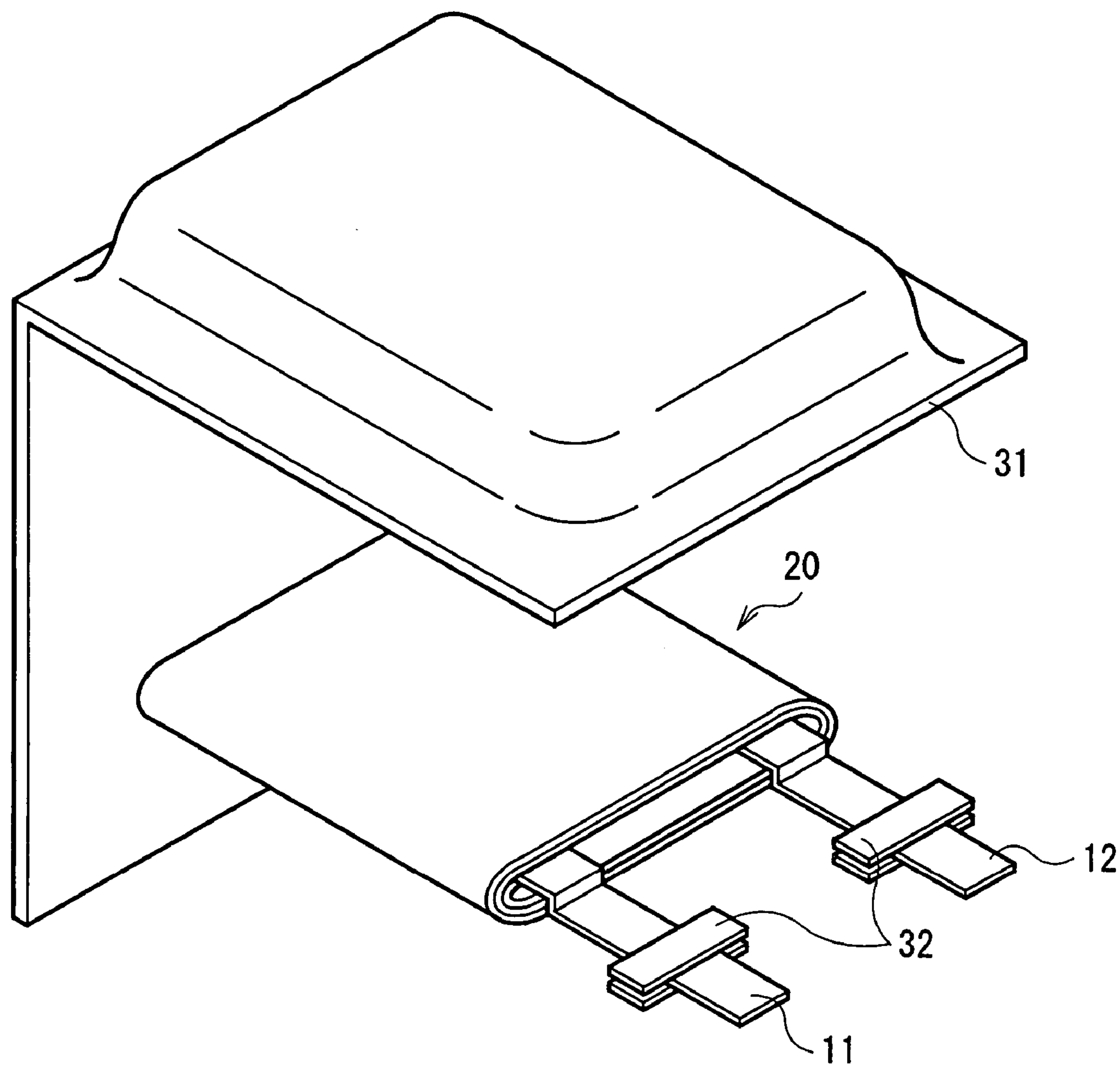
FIG. 4 is an oblique perspective figure which shows a manufacturing process following after FIGS. 3A and 3B.

Subsequently, for example, the coating layer 24A and the coating layer 24B are faced sandwiching the separator 23, so that the cathode 21 and the anode 22 are layered. After that, this layered body is wound, and the protective tape 25 is bonded to an outermost periphery part to form the battery device 20. After forming the battery device 20, as shown in FIG. 4, for example, the battery device 20 is sandwiched between one exterior member 31, and outer edge parts except for one side of the exterior member 31 are fusion bonded to each other by heat. In this regard, the adhesive films 32 are inserted between the cathode lead 11 and the exterior member 31, and anode lead 12 and the exterior member 31.

Figure 5:
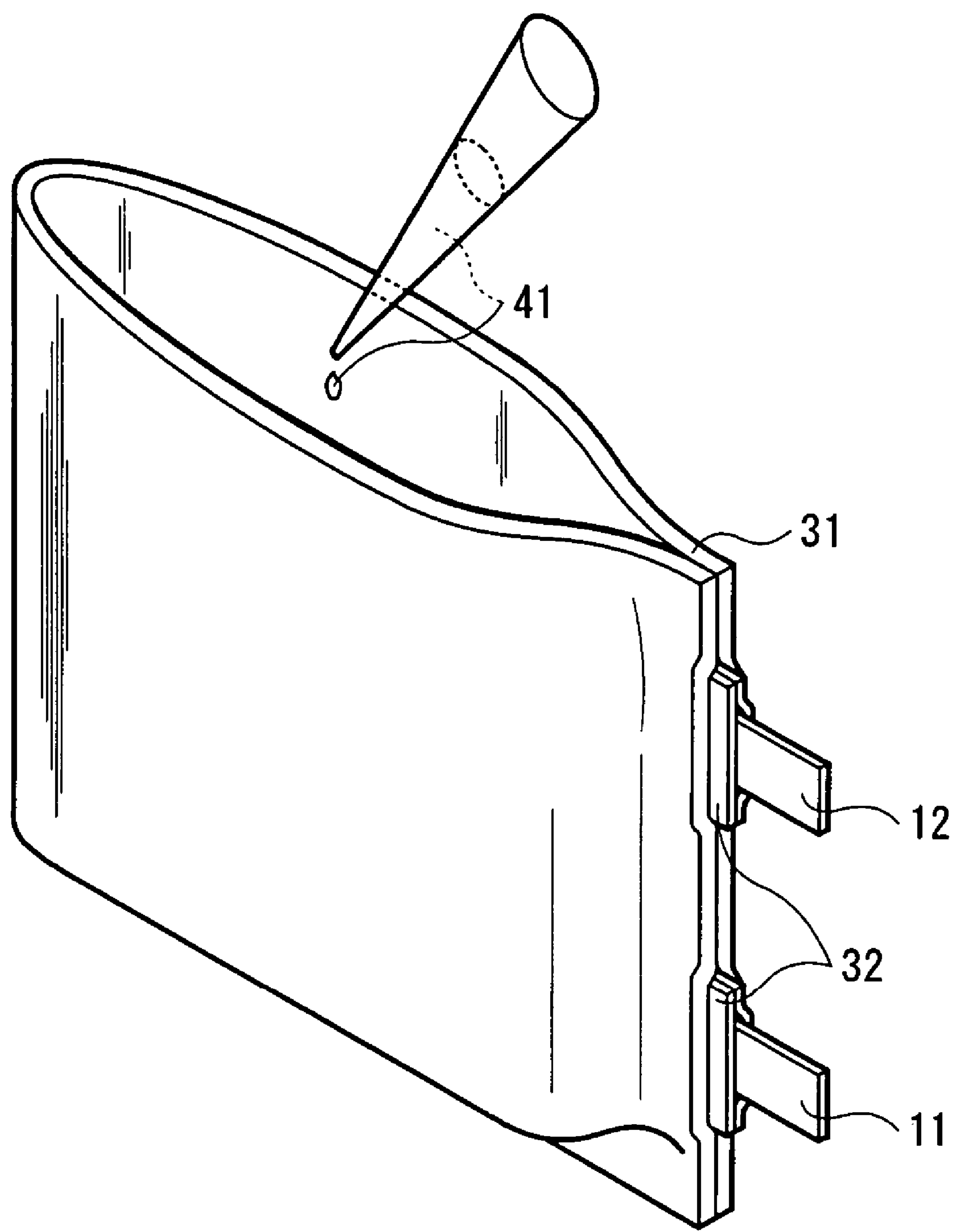
FIG. 5 is an oblique perspective figure which shows a manufacturing process following after FIG. 4.

Next, as shown in FIG. 5, an injection solution 41 containing a low viscosity solvent is injected in the coating layers 24A and 24B. After that, an opening of the exterior member 31 is fusion bonded by heat under a reduced pressure, and the secondary battery shown in FIG. 1 is assembled. As above, the low viscosity solvent is injected after forming the coating layers 24A and 24B. The reason thereof is since the low viscosity solvent is highly volatilized, the component of the electrolyte 24 containing the low viscosity solvent is hard to be controlled. Another reason thereof is that when the low viscosity solvent is impregnated in the coating layers 24A and 24B, the low viscosity solvent is decomposed in the cathode 21, and carbon dioxide gas generated thereby may cause some unfavorable problems such as swollenness of the battery.

In this regard, as the injection solution 41, it is preferable to use one which contains an electrolyte salt in addition to the low viscosity solvent. In this case, the electrolyte salt can be the same as or different from one which is contained in the coating layers 24A and 24B. Further, it is preferable that, as the injection solution 41, one whose concentration of the electrolyte salt in relation to the low viscosity solvent is not less than the content of the electrolyte salt in relation to the high viscosity solvent in the coating layers 24A and 24B is used. When much electrolyte salt is dissolved in the high viscosity solvent, a viscosity of the electrolyte 24 becomes high, and a diffusion rate of lithium ions becomes low. However, it is thought that since the injection solution 41 contains the low viscosity solvent, even when a concentration of the electrolyte salt is raised, a diffusion rate of lithium ions can be high, and sufficient battery reaction can be obtained.

Further, it is preferable that, as the injection solution 41, one which contains the electrolyte salt in relation to the solvent in the range of 0.1 mol/kg to 3.5 mol/kg is used. It is more preferable that one which contains the electrolyte salt in relation to the solvent in the range of 0.2 mol/kg to 3.0 mol/kg is used, since ion conductivity of the electrolyte 24 can be improved.

In this secondary battery, when charged, lithium ions are extracted from the cathode 21, and are inserted in the anode 22 through the electrolyte 24. When discharged, for example, lithium ions are extracted from the anode 22, and are inserted in the cathode 21 through the electrolyte 24. In this regard, when observing reaction of the cathode 21 based on the thickness direction of the cathode 21, potential in the vicinity of the cathode current collector 21A is the highest. The farther a location from the cathode current collector 21A is, the lower the potential is, and the thicker a thickness of the cathode 21 is, the larger the overvoltage (polarization) is. However, in this case, a concentration of the low viscosity solvent in the electrolyte 24 changes in the facing direction of the cathode 21 and the anode 22, and the concentration of the low viscosity solvent in the electrolyte 24 is higher between the cathode 21 and the anode 22 than on the cathode 21 side and the anode 22 side. Therefore, a diffusion rate of lithium ions becomes high, and overvoltage is reduced.

As above, according to this embodiment, firstly the coating layers 24A and 24B containing the high molecular weight compound, the high viscosity solvent, and the electrolyte salt are formed on the cathode 21 and the anode 22, and then the injection solution 41 containing the low viscosity solvent is injected in the coating layers 24A and 24B. Therefore, a concentration of the low viscosity solvent in the electrolyte 24 is changed in the facing direction of the cathode 21 and the anode 22, and the concentration of the low viscosity solvent in the electrolyte 24 is higher between the cathode 21 and the anode 22 than on the cathode 21 side and the anode 22 side. In result, chemical stability of the electrolyte 24 can be improved, a diffusion rate of lithium ions can be improved, and overvoltage of the cathode 21 can be reduced. Consequently, its load characteristics and low temperature characteristics can be improved.

In particular, when the following conditions are satisfied, higher effects can be obtained. That is, as the injection solution 41, one whose concentration of the electrolyte salt in relation to the low viscosity solvent is not less than the content of the electrolyte salt in relation to the high viscosity solvent in the coating layers 24A and 24B is used. Otherwise, as the injection solution 41, one which contains the electrolyte salt in relation to the low viscosity solvent in the range of 0.1 mol/kg to 3.5 mol/kg is used. Otherwise, a content of the electrolyte salt in relation to the solvent in the electrolyte 24 is set to from 0.36 mol/kg to 1.52 mol/kg.

Further, when the following conditions are satisfied, electrode reaction smoothly proceeds, and excellent cycle characteristics can be obtained. That is, a volume density of the anode mixture layer 22B is set to 1.0 g/cm$^3$ to 2.2 g/cm$^3$. Otherwise, an average void diameter of the anode mixture layer 22B is set to 0.2 μm to 5 μm.

EXAMPLES

Further, descriptions will be given in detail of concrete examples of the invention.

Examples 1-1 to 1-17

First, lithium carbonate ($Li_2CO_3$) and cobalt carbonate ($CoCO_3$) were mixed by a mol ratio of 0.5:1. The mixture was fired at 900° C. in the air for 5 hours to obtain a lithium-cobalt complex oxide ($LiCoO_2$). When an X-ray diffraction measurement was conducted for the obtained lithium-cobalt complex oxide, the result well corresponded to the peak of $LiCoO_2$ registered on JCPDS (Joint Committee of Powder Diffraction Standard) file. Subsequently, this lithium-cobalt complex oxide was pulverized to powders having an average particle diameter of 15 μm to obtain thereby a cathode active material.

Next, 95 parts by mass of lithium-cobalt complex oxide, 2 parts by mass of Ketjen black (manufactured by Lion Corporation) having a specific surface area of 800 m$^2$/g as a conductive agent, and 3 parts by mass of poly (vinylidene fluoride) as a binder were mixed to prepare a cathode mixture. Subsequently, as shown in FIG. 3A, the cathode mixture was diffused in a solvent, N-methyl pyrrolidone to obtain a cathode mixture slurry. The cathode mixture slurry was uniformly applied to both sides of the cathode current collector 21A made of a strip-shaped aluminum foil having a thickness of 20 μm, dried, and compression-molded to form the cathode mixture layer 21B. The cathode 21 was thereby fabricated.

30 parts by mass of carbolic pitch as a binder was added to 100 parts by mass of coal coke as a filler. After they were mixed at 100° C., the mixture was compression-molded to obtain a molded body. After this molded body was heat-treated at 1,000° C. or less to obtain a firing body (pitch impregnation process), a binder pitch which was dissolved at 200° C. or less was impregnated in this firing body, and heat-treatment was conducted at 100° C. or less (firing process). After the pitch impregnation process and the firing process were repeated several times, the firing body was heat-treated at 2,800° C. in the inert atmosphere to obtain graphite. Next, the graphite was pulverized, and then was classified and powdered to thereby obtain an anode active material.

An X-ray diffraction measurement was conducted for the obtained graphite. A face distance of face (002) was 0.337 nm, a C-axis crystal thickness of the face (002) was 50.0 nm, a true density by pycnometer method was 2.23 g/cm$^3$, a specific surface area by BET method was 1.6 m$^2$/g, an average particle diameter by laser diffraction method was 33.0 μm, a cumulative 10% particle diameter was 13.3 μm, a cumulative 50% particle diameter was 30.6 μm, a cumulative 90% particle diameter was 55.7 μm, an average value of breaking strength of graphite grains was 7.1 kgf/nm$^2$ (about $6.96\times10^7$ Pa), and a dimension density was 0.98 g/cm$^3$.

Next, 89.5 parts by mass of powdery graphite, 0.5 parts by mass of acetylene black (manufactured by Denki Kagaku Kogyo KK) having a specific surface area of 30 m$^2$/g as an anode material and a conductive agent, and, 10 parts by mass of poly (vinylidene fluoride) as a binder were mixed to prepare an anode mixture. Subsequently, as shown in FIG. 3B, the anode mixture was diffused in a solvent, N-methyl pyrrolidone to obtain an anode mixture slurry. The anode mixture slurry was uniformly applied to both sides of the anode current collector 22A made of a strip-shaped copper foil having a thickness of 10 μm, dried, and compression-molded to form the anode mixture layer 22B. The anode 22 was thereby fabricated. In this regard, a volume density of the anode mixture layer 22B was set to 1.5 g/cm$^3$, and an average void diameter of the anode mixture layer 22B was set to 3 μm.

The anode 21 was punched through in a size of 1 cm$^2$, and a volume density of the anode mixture layer 22B was found by Mathematical Formula 1.

Volume density of the anode mixture layer=mass of the anode per 1 cm$^2$−mass of the anode current collector per 1 cm$^2$/thickness of the anode-thickness of the anode current collector [Mathematical Formula 1]

An average void diameter of the anode mixture layer 22B was measured by mercury porosimeter (manufactured by Pore Master, Yuasa Ionix Inc.).

A mixture wherein a high molecular weight compound A having a weight-average molecular weight of 0.7 million, wherein hexafluoropropylene was copolymerized by a ratio of 7 wt % in vinyliden fluoride and a high molecular weight compound B having a weight-average molecular weight of 0.3 million were mixed by a mass ratio of 9:1, the solution wherein $LiPF_6$ as an electrolyte salt was dissolved in a high viscosity solvent wherein ethylene carbonate and propylene carbonate were mixed by a mass ratio of 60:40, and dimethyl carbonate (DMC) as a solvent of high molecular weight compound were mixed by a mass ratio of 1:8:13. The mixture was stirred at 70° C. to thereby fabricate a precursor solution. The solution was applied to the cathode 21 and the anode 22 respectively by using a bar coater. After that, the solvent was volatilized in a constant temperature bath at 70° C., and the coating layers 24A and 24B were formed. In this regard, in any of Examples 1-1 to 1-17, a content of an electrolyte salt to a high viscosity solvent in the coating layers 24A and 24B was adjusted to the value in Examples 1-1 to 1-17 in Table 1. In addition, a total content of the high viscosity solvent and the electrolyte salt in the coating layers 24A and 24B was changed as shown in Examples 1-1 to 1-17 in Table 1.

TABLE 1

| | Coating layer | | Injection solution | | | | Electrolyte salt |
|---|---|---|---|---|---|---|---|
| | Content of electrolyte salt (mol/kg) | High viscosity solvent + electrolyte salt (g) | Low viscosity solvent | Electrolyte salt | Content of electrolyte salt (mol/kg) | Injection volume (g) | in coating layer/electrolyte salt in injection solution (%) |
| Example 1-1 | 0.60 | 1.72 | EMC | $LiPF_6$ | 0.60 | 0.80 | 1.0 |
| Example 1-2 | 0.60 | 1.72 | EMC | $LiPF_6$ | 0.65 | 0.80 | 0.9 |
| Example 1-3 | 0.60 | 1.72 | EMC | $LiPF_6$ | 0.80 | 0.80 | 0.8 |
| Example 1-4 | 0.60 | 1.72 | EMC | $LiPF_6$ | 1.00 | 0.80 | 0.6 |
| Example 1-5 | 0.60 | 1.72 | EMC | $LiPF_6$ | 1.50 | 0.80 | 0.4 |
| Example 1-6 | 0.60 | 1.72 | EMC | $LiPF_6$ | 2.00 | 0.80 | 0.3 |
| Example 1-7 | 0.60 | 1.72 | EMC | $LiPF_6$ | 2.50 | 0.80 | 0.2 |
| Example 1-8 | 0.60 | 1.72 | EMC | $LiPF_6$ | 3.00 | 0.80 | 0.2 |
| Example 1-9 | 0.60 | 1.72 | EMC | $LiPF_6$ | 3.50 | 0.80 | 0.2 |
| Example 1-10 | 0.60 | 1.72 | EMC | $LiPF_6$ | 0.30 | 0.80 | 2.0 |
| Example 1-11 | 0.60 | 1.72 | EMC | $LiPF_6$ | 0.20 | 0.80 | 3.0 |
| Example 1-12 | 0.60 | 1.72 | EMC | $LiPF_6$ | 0.10 | 0.80 | 6.0 |
| Example 1-13 | 0.60 | 1.72 | EMC | — | 0.00 | 0.80 | — |
| Example 1-14 | 1.26 | 1.96 | EMC | $LiPF_6$ | 0.30 | 0.80 | 4.2 |
| Example 1-15 | 1.54 | 1.72 | EMC | $LiPF_6$ | 0.60 | 0.80 | 2.6 |
| Example 1-16 | 0.40 | 1.72 | EMC | $LiPF_6$ | 0.60 | 0.80 | 0.7 |
| Example 1-17 | 0.20 | 1.72 | EMC | $LiPF_6$ | 0.60 | 0.80 | 0.3 |
| Comparative example 1-1 | 0.60 | 2.22 | — | — | — | 0 | — |

TABLE 1-continued

| | Coating layer | | Injection solution | | | | Electrolyte salt |
|---|---|---|---|---|---|---|---|
| | Content of electrolyte salt (mol/kg) | High viscosity solvent + electrolyte salt (g) | Low viscosity solvent | Electrolyte salt | Content of electrolyte salt (mol/kg) | Injection volume (g) | in coating layer/electrolyte salt in injection solution (%) |
| Comparative example 1-2 | 0.79 | 2.29 | — | — | — | 0 | — |
| Comparative example 1-3 | 1.08 | 2.41 | — | — | — | 0 | — |
| Comparative example 1-4 | 1.23 | 2.44 | — | — | — | 0 | — |
| Comparative example 1-5 | 1.38 | 2.47 | — | — | — | 0 | — |
| Comparative example 1-6 | 1.52 | 2.50 | — | — | — | 0 | — |
| Comparative example 1-7 | 1.16 | 0 | — | — | — | 0 | — |
| Comparative example 1-8 | 0 | 0 | EC + PC + EMC | $LiPF_6$ | 1.16 | 0.80 | 0 |
| Comparative example 1-9 | 0.60 | 1.72 | EC + PC | $LiPF_6$ | 0.60 | 0.50 | 1.0 |

After the coating layers 24A and 24B are formed, the cathode 21 and the anode 22 were layered with the separator 23 in between, and they were wound flatly to form the battery device 20.

Subsequently, as shown in FIG. 4, the battery device 20 was sandwiched between one exterior member 31 made of an aluminum laminated film. After that, as shown in FIG. 5, two places of outer edge parts of the exterior member 31 were fusion bonded by heat. 0.8 g of injection solution 41 wherein $LiPF_6$ as an electrolyte salt was dissolved in a low viscosity solvent, ethyl methyl carbonate (EMC) was injected through a part which was not fusion bonded by heat, and enclosed under a reduced pressure. In this regard, the content of the electrolyte salt in relation to the low viscosity solvent in the injection solution 41 was adjusted to the value shown in Examples 1-1 to 1-17 in Table 1. The secondary battery shown in FIG. 1 was thereby assembled. Since the low viscosity solvent is highly volatilized, in the electrolyte 24, the content of the injection solution 41, the total content of the solvent and the electrolyte salt, a content of the electrolyte salt in relation to the solvent, a ratio of the low viscosity solvent in the solvent were as shown in Table 2.

TABLE 2

| | Electrolyte | | | | Anode mixture layer | | | | | |
|---|---|---|---|---|---|---|---|---|---|---|
| | Content of injection solution (g) | Solvent + electrolyte salt (g) | Content of electrolyte salt (mol/kg) | Ratio of low viscosity solvent in solvent (%) | Volume density (g/cm$^3$) | Average void diameter (μm) | Load characteristics (%) | Low temperature characteristics (%) | High temperature storage characteristics (%) | Cycle characteristics (%) |
| Example 1-1 | 0.50 | 2.22 | 0.669 | 22 | 1.5 | 3 | 59 | 49 | 167 | 85 |
| Example 1-2 | 0.51 | 2.23 | 0.684 | 22 | 1.5 | 3 | 61 | 50 | 166 | 86 |
| Example 1-3 | 0.53 | 2.25 | 0.719 | 22 | 1.5 | 3 | 65 | 52 | 165 | 88 |
| Example 1-4 | 0.57 | 2.29 | 0.789 | 23 | 1.5 | 3 | 72 | 55 | 163 | 89 |
| Example 1-5 | 0.65 | 2.37 | 0.931 | 23 | 1.5 | 3 | 75 | 58 | 158 | 90 |
| Example 1-6 | 0.69 | 2.41 | 1.081 | 23 | 1.5 | 3 | 80 | 68 | 155 | 92 |
| Example 1-7 | 0.72 | 2.44 | 1.232 | 21 | 1.5 | 3 | 75 | 58 | 151 | 91 |
| Example 1-8 | 0.75 | 2.47 | 1.380 | 20 | 1.5 | 3 | 70 | 52 | 149 | 87 |
| Example 1-9 | 0.78 | 2.50 | 1.523 | 19 | 1.5 | 3 | 55 | 46 | 146 | 80 |
| Example 1-10 | 0.45 | 2.17 | 0.574 | 21 | 1.5 | 3 | 41 | 32 | 169 | 78 |
| Example 1-11 | 0.43 | 2.15 | 0.542 | 21 | 1.5 | 3 | 39 | 29 | 170 | 77 |
| Example 1-12 | 0.41 | 2.13 | 0.509 | 21 | 1.5 | 3 | 37 | 27 | 173 | 77 |
| Example 1-13 | 0.38 | 2.10 | 0.479 | 20 | 1.5 | 3 | 32 | 25 | 174 | 77 |
| Example 1-14 | 0.45 | 2.41 | 1.031 | 23 | 1.5 | 3 | 45 | 35 | 157 | 78 |
| Example 1-15 | 0.50 | 2.22 | 1.380 | 25 | 1.5 | 3 | 25 | 29 | 151 | 60 |
| Example 1-16 | 0.50 | 2.22 | 0.518 | 21 | 1.5 | 3 | 55 | 45 | 176 | 76 |
| Example 1-17 | 0.50 | 2.22 | 0.367 | 21 | 1.5 | 3 | 45 | 40 | 179 | 75 |
| Comparative example 1-1 | 0 | 2.22 | 0.600 | 0 | 1.5 | 3 | 30 | 17 | 166 | 75 |
| Comparative example 1-2 | 0 | 2.22 | 0.790 | 0 | 1.5 | 3 | 35 | 15 | 160 | 69 |
| Comparative example 1-3 | 0 | 2.29 | 1.080 | 0 | 1.5 | 3 | 30 | 10 | 152 | 50 |

TABLE 2-continued

| | Electrolyte | | | | Anode mixture layer | | | | | |
|---|---|---|---|---|---|---|---|---|---|---|
| | Content of injection solution (g) | Solvent + electrolyte salt (g) | Content of electrolyte salt (mol/kg) | Ratio of low viscosity solvent in solvent (%) | Volume density (g/cm$^3$) | Average void diameter (μm) | Load characteristics (%) | Low temperature characteristics (%) | High temperature storage characteristics (%) | Cycle characteristics (%) |
| Comparative example 1-4 | 0 | 2.41 | 1.230 | 0 | 1.5 | 3 | 25 | 8 | 148 | 37 |
| Comparative example 1-5 | 0 | 2.44 | 1.380 | 0 | 1.5 | 3 | 13 | 3 | 145 | 25 |
| Comparative example 1-6 | 0 | 2.50 | 1.520 | 0 | 1.5 | 3 | 5 | 1 | 140 | 20 |
| Comparative example 1-7 | 0 | 2.41 | 1.081 | 23 | 1.5 | 3 | 35 | 20 | 280 | 21 |
| Comparative example 1-8 | 0 | 2.41 | 1.081 | 23 | 1.5 | 3 | 30 | 15 | 220 | 15 |
| Comparative example 1-9 | 0.50 | 2.22 | 0.600 | 0 | 1.5 | 3 | 30 | 17 | 166 | 75 |

As Comparative examples 1-1 to 1-7 in relation to Examples 1-1 to 1-17, secondary batteries were fabricated in a manner similar to in Examples 1-1 to 1-17 except that a content of the electrolyte salt in relation to the high viscosity solvent and the total content of the high viscosity solvent and the electrolyte salt in the coating layers 24A and 24B were changed as shown in Table 1, and the injection solution was not injected. In Comparative example 1-7, a precursor solution was fabricated by using ethyl methyl carbonate instead of dimethyl carbonate. After the precursor solution was applied to the cathode 21 and the anode 22 respectively, the solvent was volatilized in a constant temperature bath at 50° C. The coating layer were formed so that a mass ratio of ethylene carbonate:propylene carbonate:ethyl methyl carbonate was 38.5:38.5:23.

As Comparative example 1-8 in relation to Examples 1-1 to 1-17, a secondary battery was fabricated in a manner similar to in Examples 1-1 to 1-17, except that a mixture of a high molecular weight compound A and a high molecular weight compound B and N-methyl pyrrolidone as a solvent for the high molecular weight compounds A and B were mixed by a mass ratio of 1:10 to prepare a precursor solution, the precursor solution was applied to the cathode 21 and the anode 22 respectively, and N-methyl pyrrolidone was volatilized in a constant temperature bath at 130° C. to form coating layer, and concurrently, as an injection solution, the solution wherein $LiPF_6$ was dissolved in a solvent of a mixture of ethylene carbonate, propylene carbonate, and ethyl methyl carbonate by a mass ratio of 35:35:30, so that the content of $LiPF_6$ in relation to the solvent was 1.16 mol/kg was used. In Comparative example 1-8, in the electrolyte 24, a mass ratio of ethylene carbonate:propylene carbonate:ethyl methyl carbonate was 38.5:38.5:23.

Further, as Comparative example 1-9 in relation to Examples 1-1 to 1-17, a secondary battery was fabricated in a manner similar to in Example 1-1, except that as an injection solution, the solution wherein $LiPF_6$ was dissolved in a solvent of a mixture of ethylene carbonate and propylene carbonate by a mass ratio of 60:40, so that the content of $LiPF_6$ in relation to the solvent was 0.60 mol/kg was used.

Regarding the fabricated secondary batteries of Examples 1-1 to 1-17 and Comparative examples 1-1 to 1-9, their load characteristics were evaluated as follows. First, constant current and constant voltage charge was performed until a total charge time reached 3 hours in the environment of 23° C. under the condition of an upper limit voltage of 4.2 V and a current of 1 C. After that, constant current discharge was performed under the condition of a current of 0.2 C and a final voltage of 3 V. Next, constant current and constant voltage charge was performed until a total charge time reached 3 hours in the environment of 23° C. under the condition of an upper voltage of 4.2 V and a current of 1 C. After that, constant current discharge was performed under the condition of a current of 3 C and a final voltage of 3 V. Load characteristics were found by an expression of (Discharge capacity at an current of 3 C (mAh))/(discharge capacity at an current of 0.2 C (h))×100. Discharge capacities were found by an expression of Current value×(discharge time until final voltage of 3.0 V). 1 C represents a current value which discharges a rated capacity of the battery for 1 hour. 0.2 C represents a current value which discharges a rated capacity of the battery for 5 hours, and 3 C represents a current value which discharges a rated capacity of the battery for 20 minutes.

Regarding the secondary batteries of Examples 1-1 to 1-17 and Comparative examples 1-1 to 1-9, their low temperature characteristics were evaluated as follows. First, constant current and constant voltage charge was performed until a total charge time reached 3 hours in the environment of 23° C. under the condition of an upper limit voltage of 4.2 V and a current of 1 C. After that, constant current discharge was performed in the environment of 23° C. under the condition of a current of 0.5 C and a final voltage of 3 V. Next, constant current and constant voltage charge was performed until a total charge time reached 3 hours in the environment of 23° C. under the condition of an upper voltage of 4.2 V and a current of 1 C. After that, constant current discharge was performed in the environment of −20° C. under the condition of a current of 3 C and a final voltage of 3V. Low temperature characteristics were found by an expression of (Discharge capacity at −20° C.)/(discharge capacity at 23° C.)×100.

Further, regarding the secondary batteries of Examples 1-1 to 1-17 and Comparative examples 1-1 to 1-9, their high temperature storage characteristics were evaluated as follows. First, constant current and constant voltage charge was performed until a total charge time reached 10 hours in the environment of 23° C. under the condition of an upper limit voltage of 4.25 V and a current of 0.2 C. After that, their thicknesses before storage were measured. Next, the secondary batteries were stored in a constant temperature bath at 80° C. for 4 days. Then they were removed from the constant temperature bath at 80° C., and their thicknesses after storage were measured in the environment of 23° C. within 3 minutes after removal. High temperature storage characteristics were found by an expression of (Thickness of the battery after storage)/(thickness of the battery before storage)×100.

In addition, regarding the secondary batteries of Examples 1-1 to 1-17 and Comparative examples 1-1 to 1-9, their cycle characteristics were evaluated as follows. First, constant current and constant voltage charge was performed until a total charge time reached 3 hours in the environment of 23° C. under the condition of an upper limit voltage of 4.2 V and a current of 1 C. After that, constant current discharge was performed in the environment of 23° C. under the condition of a current of 0.2 C and a final voltage of 3 V. After performing 200 cycles of the charge and discharge, cycle characteristics were found by an expression of (Discharge capacity at the 200th cycle)/(discharge capacity at the first cycle)×100.

Obtained load characteristics, low temperature characteristics, high temperature storage characteristics, and cycle characteristics are shown in Table 2. In addition, in FIG. 6, a relation between contents of the electrolyte salt in the electrolyte 24 and the load characteristics is shown. In FIG. 7, a relation between contents of the electrolyte salt in the electrolyte 24 and the low temperature characteristics is shown.

Figure 6:
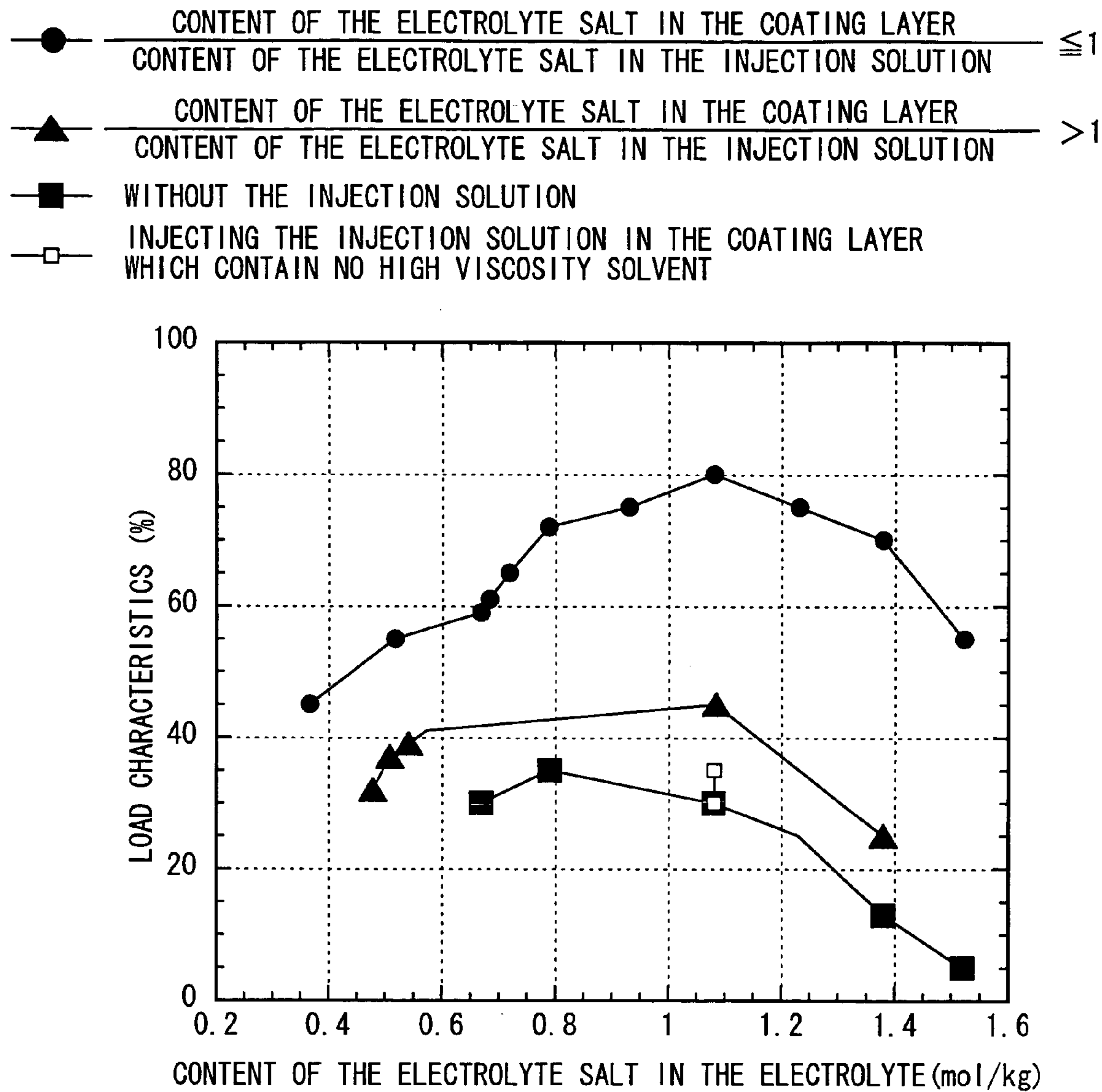
FIG. 6 is a property diagram which shows load characteristics according to examples of the invention.
Figure 7:
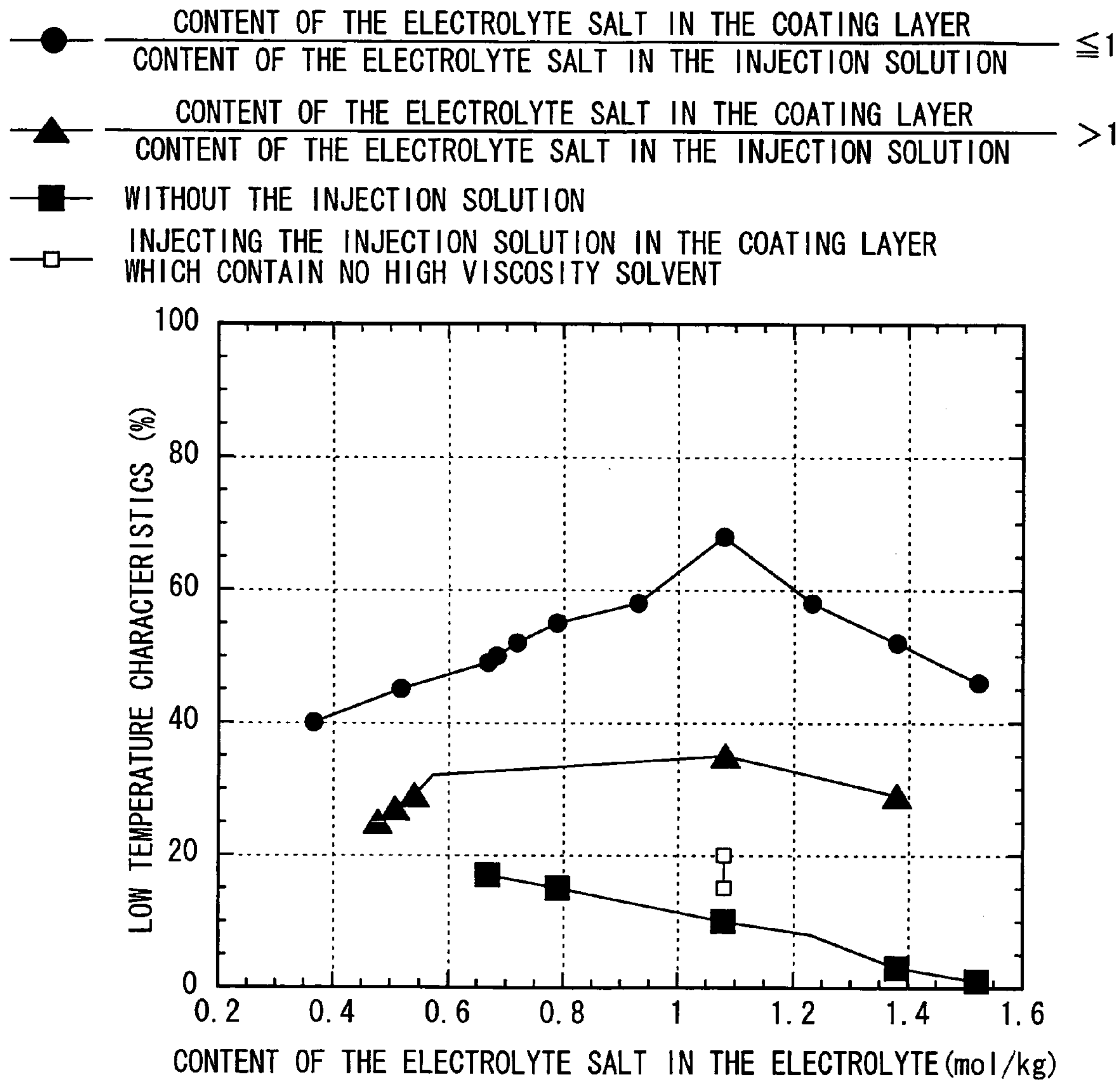
FIG. 7 is a property diagram which shows low temperature characteristics according to the examples of the invention.

As evidenced by Table 2, FIGS. 6 and 7, compared to Comparative examples 1-1 to 1-6, wherein the injection solution was not injected, load characteristics and low temperature characteristics of Examples 1-1 to 1-17, wherein firstly the coating layers 24A and 24B were formed, and then the injection solution 41 was injected were excellent, even when contents of the electrolyte salt in the electrolyte 24 were the same. The reason thereof is not clear. However, the following might be the reason. That is, when observing reaction of the cathode 21 based on the thickness direction of the cathode 21, potential in the vicinity of the cathode current collector 21A is the highest. The farther a location from the cathode current collector 21A is, the lower the potential is, and the thicker the thickness of the cathode 21 is, the larger the overvoltage (polarization) is, resulting in lowered battery characteristics. In the case, wherein firstly the coating layers 24A and 24B were formed on the cathode 21 and the anode 22, and then the injection solution 41 was injected, ethyl methyl carbonate was not injected so much in the coating layers 24A and 24B since its compatibility with high molecular weight compounds was low. However, viscosity of ethyl methyl carbonate was lower than of ethylene carbonate and propylene carbonate. Therefore, ethyl methyl carbonate was easy to enter in a pore film such as the separator 23. Consequently, since ethyl methyl carbonate having a low viscosity selectively entered in the separator 23 near the surface of the cathode 21, a diffusion rate of lithium ions became high, overvoltage (polarization) was reduced, and battery characteristics were improved.

That is, it was found that when firstly the coating layers 24A and 24B containing the high molecular weight compound, the high viscosity solvent, and the electrolyte salt are formed on the cathode 21 and the anode 22, and then the injection solution 41 containing the low viscosity solvent is injected, load characteristics and low temperature characteristics can be improved.

Further, as evidenced by Examples 1-1 to 1-17, in Examples 1-1 to 1-9, 1-16, and 1-17, wherein the injection solution 41 whose concentration of the electrolyte salt in relation to the low viscosity solvent was not less than the content of the electrolyte salt in the coating layers 24A and 24B was used, both load characteristics and low temperature characteristics were exponentially improved, compared to in Examples 1-10 to 1-12, 1-14, and 1-15, wherein the injection solution 41 whose concentration of the electrolyte salt in relation to the low viscosity solvent was less than the content of the electrolyte salt in the coating layers 24A and 24B was used. The reason thereof is supposed as follows. That is, when there are few lithium ions in the vicinity of the cathode active material or the anode active material, battery reaction is hard to arise. Meanwhile, when there are many lithium ions, a diffusion rate of lithium ions becomes low. However, in this case, there were much ethyl methyl carbonate having a low viscosity in the separator 23 close to the surfaces of the cathode 21 and the anode 22. Therefore, even when a concentration of lithium ions became high, the diffusion rate became high, and battery reaction could be improved.

Further, as evidenced by Examples 1-1 to 1-17, it was found that there is an optimal value for contents of the electrolyte salt in the injection solution 41. That is, it was found that a content of the electrolyte salt in the injection solution 41 in relation to the low viscosity solvent is preferably from 0.1 mol/kg to 3.5 mol/kg, and more preferably from 0.2 mol/kg to 3.0 mol/kg. In addition, it was also found that there is an optimal value for contents of the electrolyte salt in the electrolyte 24. That is, it was found that a content of the electrolyte salt in the electrolyte 24 is preferably from 0.36 mol/kg to 1.52 mol/kg, and more preferably from 0.5 mol/kg to 1.4 mol/kg.

In Comparative example 1-7, high temperature storage characteristics were inferior. The reason thereof can be thought as follows. That is, before injecting the injection solution, there was no solvent in the coating layer. Therefore, even ethylene carbonate having a low compatibility with high molecular weight compounds was easy to enter in the coating layer when the injection solution was injected. Ethylene carbonate also entered in the cathode and the anode. When the battery was charged and stored at high temperatures, ethyl methyl carbonate in the cathode was oxidized and decomposed, and then carbon dioxide gas was generated.

Examples 2-1 and 2-2

Secondary batteries were fabricated in a manner similar to in Example 1-6, except that dimethyl carbonate (DMC) or diethyl carbonate (DEC) was used as a low viscosity solvent instead of ethyl methyl carbonate, as shown in Table 3. In the electrolyte 24, a content of the injection solution 41, the total content of the solvent and the electrolyte salt, a content of the electrolyte salt in relation to the solvent, and a ratio of the low viscosity solvent in the solvent are as shown in Table 4. For the secondary batteries of Examples 2-1 and 2-2, load characteristics, low temperature characteristics, high temperature characteristics, and cycle characteristics were also examined in a manner similar to in Example 1-6. The results are shown in Table 4 together with results of Example 1-6 and Comparative examples 1-1 to 1-9.

TABLE 3

| | Coating layer | | Injection solution | | | | Electrolyte salt |
|---|---|---|---|---|---|---|---|
| | Content of electrolyte salt (mol/kg) | High viscosity solvent + electrolyte salt (g) | Low viscosity solvent | Electrolyte salt | Content of electrolyte salt (mol/kg) | Injection volume (g) | in coating layer/electrolyte salt in injection solution (%) |
| Example 1-6 | 0.60 | 1.72 | EMC | $LiPF_6$ | 2.00 | 0.80 | 0.3 |
| Example 2-1 | 0.60 | 1.72 | DMC | $LiPF_6$ | 2.00 | 0.80 | 0.3 |
| Example 2-2 | 0.60 | 1.72 | DEC | $LiPF_6$ | 2.00 | 0.80 | 0.3 |
| Comparative Example 1-1 | 0.60 | 2.22 | — | — | — | 0 | — |
| Comparative Example 1-2 | 0.79 | 2.29 | — | — | — | 0 | — |
| Comparative Example 1-3 | 1.08 | 2.41 | — | — | — | 0 | — |
| Comparative Example 1-4 | 1.23 | 2.44 | — | — | — | 0 | — |
| Comparative Example 1-5 | 1.38 | 2.47 | — | — | — | 0 | — |
| Comparative Example 1-6 | 1.52 | 2.50 | — | — | — | 0 | — |
| Comparative Example 1-7 | 1.16 | 0 | — | — | — | 0 | — |
| Comparative Example 1-8 | 0 | 0 | EC + PC + EMC | $LiPF_6$ | 1.16 | 0.80 | 0 |
| Comparative Example 1-9 | 0.60 | 1.72 | EC + PC | $LiPF_6$ | 0.60 | 0.50 | 1.0 |

TABLE 4

| | Electrolyte | | | | Anode mixture layer | | | | | |
|---|---|---|---|---|---|---|---|---|---|---|
| | Content of injection solution (g) | Solvent + electrolyte salt (g) | Content of electrolyte salt (mol/kg) | Ratio of low viscosity solvent in solvent (%) | Volume density (g/cm$^3$) | Average void diameter (μm) | Load charac-teristics (%) | Low temperature characteristics (%) | High temperature storage characteristics (%) | Cycle charac-teristics (%) |
| Example 1-6 | 0.69 | 2.41 | 1.081 | 23 | 1.5 | 3 | 80 | 68 | 155 | 92 |
| Example 2-1 | 0.50 | 2.22 | 1.174 | 14 | 1.5 | 3 | 85 | 68 | 185 | 94 |
| Example 2-2 | 0.74 | 2.46 | 1.060 | 25 | 1.5 | 3 | 70 | 50 | 130 | 90 |
| Comparative example 1-1 | 0 | 2.22 | 0.600 | 0 | 1.5 | 3 | 30 | 17 | 166 | 75 |
| Comparative example 1-2 | 0 | 2.22 | 0.790 | 0 | 1.5 | 3 | 35 | 15 | 160 | 69 |
| Comparative example 1-3 | 0 | 2.29 | 1.080 | 0 | 1.5 | 3 | 30 | 10 | 152 | 50 |
| Comparative example 1-4 | 0 | 2.41 | 1.230 | 0 | 1.5 | 3 | 25 | 8 | 148 | 37 |
| Comparative example 1-5 | 0 | 2.44 | 1.380 | 0 | 1.5 | 3 | 13 | 3 | 145 | 25 |
| Comparative example 1-6 | 0 | 2.50 | 1.520 | 0 | 1.5 | 3 | 5 | 1 | 140 | 20 |
| Comparative example 1-7 | 0 | 2.41 | 1.081 | 23 | 1.5 | 3 | 35 | 20 | 280 | 21 |
| Comparative example 1-8 | 0 | 2.41 | 1.081 | 23 | 1.5 | 3 | 30 | 15 | 220 | 15 |
| Comparative example 1-9 | 0.50 | 2.22 | 0.600 | 0 | 1.5 | 3 | 30 | 17 | 166 | 75 |

As evidenced by Table 4, according to Examples 2-1 and 2-2, load characteristics and low temperature characteristics could be improved as in Example 1-6, compared to Comparative examples 1-1 to 1-6. That is, it was found that load characteristics and low temperature storage characteristics could be improved even when using other low viscosity solvent.

Examples 3-1 to 3-3

Secondary batteries were fabricated in a manner similar to in Example 1-3, except that the injection solution 41 containing LiN $(SO_2CF_3)_2$, LiN $(SO_2C_2F_5)$, or $LiBF_4$ was used instead of $LiPF_6$ as shown in Table 5. In the electrolyte 24, contents of the injection solution 41, total contents of the solvent and the electrolyte salt, contents of the electrolyte salt in relation to the solvent, and ratios of the low viscosity solvent in the solvent are as shown in Table 6. For the secondary batteries of Examples 3-1 to 3-3, load characteristics, low temperature characteristics, high temperature characteristics, and cycle characteristics were examined in a manner similar to in Example 1-6. The results are shown in Table 6 together with results of Example 1-3 and Comparative examples 1-1 to 1-9.

TABLE 5

| | Coating layer | | Injection solution | | | | Electrolyte salt |
|---|---|---|---|---|---|---|---|
| | Content of electrolyte salt (mol/kg) | High viscosity solvent + electrolyte salt (g) | Low viscosity solvent | Electrolyte salt | Content of electrolyte salt (mol/kg) | Injection volume (g) | in coating layer/electrolyte salt in injection solution (%) |
| Example 1-3 | 0.60 | 1.72 | EMC | $LiPF_6$ | 0.80 | 0.80 | 0.8 |
| Example 3-1 | 0.60 | 1.72 | EMC | $LiN(SO_2CF_3)_2$ | 0.80 | 0.80 | 0.8 |
| Example 3-2 | 0.60 | 1.72 | EMC | $LiN(SO_2C_2F_5)_2$ | 0.80 | 0.80 | 0.8 |
| Example 3-3 | 0.60 | 1.72 | EMC | $LiBF_4$ | 0.80 | 0.80 | 0.8 |
| Comparative Example 1-1 | 0.60 | 2.22 | — | — | — | 0 | — |
| Comparative Example 1-2 | 0.79 | 2.29 | — | — | — | 0 | — |
| Comparative Example 1-3 | 1.08 | 2.41 | — | — | — | 0 | — |
| Comparative Example 1-4 | 1.23 | 2.44 | — | — | — | 0 | — |
| Comparative Example 1-5 | 1.38 | 2.47 | — | — | — | 0 | — |
| Comparative Example 1-6 | 1.52 | 2.50 | — | — | — | 0 | — |
| Comparative Example 1-7 | 1.16 | 0 | — | — | — | 0 | — |
| Comparative Example 1-8 | 0 | 0 | EC + PC + EMC | $LiPF_6$ | 1.16 | 0.80 | 0 |
| Comparative Example 1-9 | 0.60 | 1.72 | EC + PC | $LiPF_6$ | 0.60 | 0.50 | 1.0 |

TABLE 6

| | Electrolyte | | | | Anode mixture layer | | | | | |
|---|---|---|---|---|---|---|---|---|---|---|
| | Content of injection solution (g) | Solvent + electrolyte salt (g) | Content of electrolyte salt (mol/kg) | Ratio of low viscosity solvent in solvent (%) | Volume density ($g/cm^3$) | Average void diameter (μm) | Load characteristics (%) | Low temperature characteristics (%) | High temperature storage characteristics (%) | Cycle characteristics (%) |
| Example 1-3 | 0.53 | 2.25 | 0.719 | 22 | 1.5 | 3 | 65 | 52 | 165 | 88 |
| Example 3-1 | 0.54 | 2.26 | 0.728 | 19 | 1.5 | 3 | 80 | 72 | 160 | 84 |
| Example 3-2 | 0.58 | 2.30 | 0.716 | 19 | 1.5 | 3 | 81 | 74 | 155 | 87 |
| Example 3-3 | 0.52 | 2.24 | 0.735 | 23 | 1.5 | 3 | 77 | 64 | 130 | 82 |
| Comparative example 1-1 | 0 | 2.22 | 0.600 | 0 | 1.5 | 3 | 30 | 17 | 166 | 75 |
| Comparative example 1-2 | 0 | 2.22 | 0.790 | 0 | 1.5 | 3 | 35 | 15 | 160 | 69 |
| Comparative example 1-3 | 0 | 2.29 | 1.080 | 0 | 1.5 | 3 | 30 | 10 | 152 | 50 |
| Comparative example 1-4 | 0 | 2.41 | 1.230 | 0 | 1.5 | 3 | 25 | 8 | 148 | 37 |
| Comparative example 1-5 | 0 | 2.44 | 1.380 | 0 | 1.5 | 3 | 13 | 3 | 145 | 25 |
| Comparative example 1-6 | 0 | 2.50 | 1.520 | 0 | 1.5 | 3 | 5 | 1 | 140 | 20 |
| Comparative example 1-7 | 0 | 2.41 | 1.081 | 23 | 1.5 | 3 | 35 | 20 | 280 | 21 |
| Comparative example 1-8 | 0 | 2.41 | 1.081 | 23 | 1.5 | 3 | 30 | 15 | 220 | 15 |
| Comparative example 1-9 | 0.50 | 2.22 | 0.600 | 0 | 1.5 | 3 | 30 | 17 | 166 | 75 |

As evidenced by Table 6, according to Examples 3-1 to 3-3, both load characteristics and low temperature storage characteristics could be improved as in Example 1-1, compared to in Comparative examples 1-1 to 1-9. That is, it was found that load characteristics and low temperature characteristics could be improved even when the injection solution 41 containing other lithium salt was used.

Examples 4-1 to 4-8

Secondary batteries were fabricated in a manner similar to in Example 1-1, except that volume densities and averagevoid diameters of the anode mixture layer 22B were changed as shown in Table 8. In the electrolyte 24, contents of the injection solution 41, total contents of the solvent and the electrolyte salt, contents of the electrolyte salt in relation to the solvent, ratios of the low viscosity solvent in the solvent are as shown in Table 8. For the secondary batteries of Examples 4-1 to 4-8, load characteristics, low temperature characteristics, high temperature characteristics, and cycle characteristics were examined in a manner similar to in Example 1-6. The results are shown in Table 8 together with results of Example 1-1 and Comparative examples 1-1 to 1-9.

TABLE 7

| | Coating layer: Content of electrolyte salt (mol/kg) | Coating layer: High viscosity solvent + electrolyte salt (g) | Injection solution: Low viscosity solvent | Injection solution: Electrolyte salt | Injection solution: Content of electrolyte salt (mol/kg) | Injection solution: Injection volume (g) | Electrolyte salt in coating layer/electrolyte salt in injection solution (%) |
|---|---|---|---|---|---|---|---|
| Example 1-1 | 0.60 | 1.72 | EMC | $LiPF_6$ | 0.60 | 0.80 | 1.0 |
| Example 4-1 | 0.60 | 1.72 | EMC | $LiPF_6$ | 0.60 | 0.80 | 1.0 |
| Example 4-2 | 0.60 | 1.72 | EMC | $LiPF_6$ | 0.60 | 0.80 | 1.0 |
| Example 4-3 | 0.60 | 1.72 | EMC | $LiPF_6$ | 0.60 | 0.80 | 1.0 |
| Example 4-4 | 0.60 | 1.72 | EMC | $LiPF_6$ | 0.60 | 0.80 | 1.0 |
| Example 4-5 | 0.60 | 1.72 | EMC | $LiPF_6$ | 0.60 | 0.80 | 1.0 |
| Example 4-6 | 0.60 | 1.72 | EMC | $LiPF_6$ | 0.60 | 0.80 | 1.0 |
| Example 4-7 | 0.60 | 1.72 | EMC | $LiPF_6$ | 0.60 | 0.80 | 1.0 |
| Example 4-8 | 0.60 | 1.72 | EMC | $LiPF_6$ | 0.60 | 0.80 | 1.0 |
| Comparative Example 1-1 | 0.60 | 2.22 | — | — | — | 0 | — |
| Comparative Example 1-2 | 0.79 | 2.29 | — | — | — | 0 | — |
| Comparative Example 1-3 | 1.08 | 2.41 | — | — | — | 0 | — |
| Comparative Example 1-4 | 1.23 | 2.44 | — | — | — | 0 | — |
| Comparative Example 1-5 | 1.38 | 2.47 | — | — | — | 0 | — |
| Comparative Example 1-6 | 1.52 | 2.50 | — | — | — | 0 | — |
| Comparative Example 1-7 | 1.16 | 0 | — | — | — | 0 | — |
| Comparative Example 1-8 | 0 | 0 | EC + PC + EMC | $LiPF_6$ | 1.16 | 0.80 | 0 |
| Comparative Example 1-9 | 0.60 | 1.72 | EC + PC | $LiPF_6$ | 0.60 | 0.50 | 1.0 |

TABLE 8

| | Electrolyte: Content of injection solution (g) | Electrolyte: Solvent + electrolyte salt (g) | Electrolyte: Content of electrolyte salt (mol/kg) | Electrolyte: Ratio of low viscosity solvent in solvent (%) | Anode mixture layer: Volume density ($g/cm^3$) | Anode mixture layer: Average void diameter (μm) | Load characteristics (%) | Low temperature characteristics (%) | High temperature storage characteristics (%) | Cycle characteristics (%) |
|---|---|---|---|---|---|---|---|---|---|---|
| Example 1-1 | 0.50 | 2.22 | 0.669 | 22 | 1.5 | 3 | 59 | 49 | 167 | 85 |
| Example 4-1 | 0.50 | 2.22 | 0.669 | 22 | 1.7 | 2 | 58 | 49 | 165 | 85 |
| Example 4-2 | 0.48 | 2.20 | 0.675 | 21 | 2.0 | 0.5 | 57 | 48 | 167 | 84 |
| Example 4-3 | 0.45 | 2.17 | 0.685 | 20 | 2.2 | 0.2 | 55 | 47 | 165 | 82 |
| Example 4-4 | 0.51 | 2.23 | 0.666 | 22 | 1.4 | 3 | 60 | 52 | 167 | 86 |
| Example 4-5 | 0.52 | 2.24 | 0.663 | 23 | 1.2 | 4 | 61 | 50 | 165 | 84 |
| Example 4-6 | 0.53 | 2.25 | 0.660 | 23 | 1.0 | 5 | 57 | 46 | 164 | 82 |
| Example 4-7 | 0.30 | 2.02 | 0.736 | 13 | 2.4 | 0.1 | 30 | 24 | 162 | 65 |
| Example 4-8 | 0.55 | 2.27 | 0.654 | 24 | 0.8 | 7 | 40 | 25 | 161 | 72 |
| Comparative example 1-1 | 0 | 2.22 | 0.600 | 0 | 1.5 | 3 | 30 | 17 | 166 | 75 |
| Comparative example 1-2 | 0 | 2.22 | 0.790 | 0 | 1.5 | 3 | 35 | 15 | 160 | 69 |
| Comparative example 1-3 | 0 | 2.29 | 1.080 | 0 | 1.5 | 3 | 30 | 10 | 152 | 50 |
| Comparative example 1-4 | 0 | 2.41 | 1.230 | 0 | 1.5 | 3 | 25 | 8 | 148 | 37 |
| Comparative example 1-5 | 0 | 2.44 | 1.380 | 0 | 1.5 | 3 | 13 | 3 | 145 | 25 |
| Comparative example 1-6 | 0 | 2.50 | 1.520 | 0 | 1.5 | 3 | 5 | 1 | 140 | 20 |
| Comparative example 1-7 | 0 | 2.41 | 1.081 | 23 | 1.5 | 3 | 35 | 20 | 280 | 21 |
| Comparative example 1-8 | 0 | 2.41 | 1.081 | 23 | 1.5 | 3 | 30 | 15 | 220 | 15 |
| Comparative example 1-9 | 0.50 | 2.22 | 0.600 | 0 | 1.5 | 3 | 30 | 17 | 166 | 75 |

As evidenced by Table 8, according to Examples 4-1 to 4-8, both load characteristics and low temperature characteristics could be improved as in Example 1-1, compared to in Comparative examples 1-1 to 1-9. However, in Examples 4-7 and 4-8, cycle characteristics were inferior compared to in Comparative examples 1-1 and 1-2. The reason thereof is supposed as follows. That is, when the cathode mixture layer 22B had a high volume density and a small average void diameter, permeability of the electrolyte to the anode 22 was low. Therefore, there was variance in a ratio of ethylene carbonate, propylene carbonate, and ethyl methyl carbonate inside of the anode 22. Meanwhile, when the cathode mixture layer 22B had a low volume density and a large average void diameter, contact properties between the anode active material particles were low. Therefore, in that case, battery reaction did not proceed well.

That is, it was found that there is optimal values for a volume density and an average void diameter of the anode mixture layer 22B. It was also found that the volume density is preferably from 1.0 g/cm$^3$ to 2.2 g/cm$^3$, and more preferably from 1.2 g/cm$^3$ to 2.0 g/cm$^3$, and the average void diameter is preferably from 0.2 μm to 5 μm, and more preferably from 0.5 μm to 4 μm.

While the invention has been described with reference to the embodiment and examples, the invention is not limited to the foregoing embodiment and examples, and various modifications may be made. For example, though in the foregoing embodiment and examples, the gelatinous electrolyte, wherein the solvent and the electrolyte salt were held in the high molecular weight compound was used. However, other electrolyte can be used. Examples of other electrolyte include a solid electrolyte having ion conductivity, a mixture of a solid electrolyte, a solvent and an electrolyte salt, and a mixture of a solid electrolyte and a gelatinous electrolyte.

As the solid electrolyte, for example, an organic solid electrolyte, wherein an electrolyte salt is diffused in a high molecular weight compound having ion conductivity, or an inorganic solid electrolyte comprised of ion conducting glass or ionic crystal can be used. In this regard, as the high molecular weight compound, for example, an ether high molecular weight compound such as polyethylene oxide or a cross-linked polymer containing polyethylene oxide, an ester high molecular weight compound such as polymethacrylate, and an acrylate high molecular weight compound can be used individually, by mixing them, or by copolymerization in molecules. As the inorganic solid electrolyte, lithium nitride, lithium iodide or the like can be used.

Further, in the foregoing embodiment and examples, the winding laminated type secondary battery has been described. However, the invention can be applied similarly to a multilayer laminated type secondary battery. In addition, the invention can be applied to secondary batteries of so-called cylinder type, square type, coin type, button type and the like. Further, the invention can be applied not only to the secondary batteries, but also to primary batteries.

Further, in the foregoing embodiment and examples, the case using lithium for battery reaction has been described. However, the invention can be applied similarly to cases using other alkali metals such as sodium (Na) and kalium (K), alkali earth metals such as magnesium and calcium (Ca), other light metals such as aluminum, lithium, and alloys thereof. In these cases, similar effects can be obtained. In these cases, regarding the cathode active material, the anode active material, and the electrolyte salt, materials corresponding to respective light metals are used. Except that, these cases can be constructed in a manner similar to in the foregoing embodiment.

As described above, according to the invention, the electrolyte is formed by firstly forming the coating layer containing the high molecular weight compound, the high viscosity solvent and the electrolyte salt on the cathode and anode, and then injecting the injection solution containing the low viscosity solvent in the coating layer. Further, according to the invention, a concentration of the low viscosity solvent in the electrolyte changes in the facing direction of the cathode and the anode, and the concentration of the low viscosity solvent in the electrolyte is higher between the cathode and the anode than on the cathode side and the anode side. Therefore, chemical stability in the battery can be improved, a diffusion rate of ions generated by dissociation of the electrolyte salt can be improved, and overvoltage in the cathode can be reduced. Consequently, load characteristics and low temperature characteristics can be improved.

Specially, higher effects can be obtained under the conditions as follows. That is, a content of the electrolyte salt in relation to the solvent in the electrolyte is in the range of 0.36 mol/kg to 1.52 mol/kg. Otherwise, the injection solution, which contains the electrolyte salt in relation to the low viscosity solvent in the range of 0.1 mol/kg to 3.5 mol/kg is used. Otherwise, the injection solution, which contains the electrolyte salt whose concentration in relation to the low viscosity solvent is not less than the content of the electrolyte salt in relation to the high viscosity solvent in the coating layer is used.

Further, when a volume density of the anode mixture layer is from 1.0 g/cm$^3$ to 2.2 g/cm$^3$, or an average void diameter of the anode mixture layer is from 0.2 μm to 5 μm, battery reaction smoothly proceeds, and excellent cycle characteristics can be obtained.

Obviously many modifications and variations of the present invention are possible in the light of the above teachings. It is therefore to be understood that within the scope of the appended claims the invention may be practiced otherwise than as specifically described.

What is claimed is:

1. A battery comprising:

a cathode;

an anode; and an electrolyte, wherein, (a) the electrolyte contains a high molecular weight compound, a solvent containing a high viscosity solvent whose boiling point is more than 150° C. and a low viscosity solvent whose boiling point is 150° C. or less, and an electrolyte salt, (b) the electrolyte is formed by forming a coating layer containing the high molecular weight compound, the high viscosity solvent, and the electrolyte salt on the cathode and the anode, and then injecting an injection solution containing the low viscosity solvent in the coating layer, and (c) the electrolyte is formed by using the injection solution which contains an electrolyte salt in relation to the lower viscosity solvent having a higher concentration than a content of an electrolyte salt in relation to the high viscosity solvent in the coating layer.

2. A battery comprising:

a cathode;

an anode; and an electrolyte, wherein, (a) the electrolyte contains a high molecular weight compound, a solvent containing a high viscosity solvent whose boiling point is more than 150° C. and a low viscosity solvent whose boiling point is 150° C. or less, and an electrolyte salt, (b) the electrolyte is formed by forming a coating layer containing the high molecular weight compound, the high viscosity solvent, and the electrolyte salt on the cathode and the anode, and then injecting an injection solution containing the low viscosity solvent in the coating layer, and (c) the anode comprises an anode current collector and an anode mixture layer provided on the anode current collector, and a volume density of the anode mixture layer is from 1.0 g/cm$^3$ to 2.2 g/ cm$^3$.

3. A battery comprising:

a cathode;

an anode; and an electrolyte, wherein, (a) the electrolyte contains a high molecular weight compound, a solvent containing a high viscosity solvent whose boiling point is more than 150° C. and a low viscosity solvent whose boiling point is 150° C. or less, and an electrolyte salt, (b) the electrolyte is formed by forming a coating layer containing the high molecular weight compound, the high viscosity solvent, and the electrolyte salt on the cathode and the anode, and then injecting an injection solution containing the low viscosity solvent in the coating layer, and (c) the anode comprises an anode current collector and an anode mixture layer provided on the anode current collector, and an average void diameter of the anode mixture layer is from 0.2 μm to 5 μm.

4. A battery according to any of claims 1, 2 and 3, wherein a content of the electrolyte salt in the electrolyte is in the range of 0.36 mol/kg to 1.52 mol/kg in relation to the solvent.

5. A battery according to any of claims 1, 2 and 3, wherein the electrolyte is formed by using the injection solution which contains an electrolyte salt in the range of 0.1 mol/kg to 3.5 mol/kg in relation to the low viscosity solvent.

6. A battery according to any of claims 1, 2 and 3, wherein the electrolyte is formed by using the injection solution which contains ethyl methyl carbonate.

7. A battery according to any of claims 1, 2 and 3, wherein the electrolyte is formed by using the injection solution which contains diethyl carbonate.

8. A battery according to any of claims 1, 2 and 3, wherein the electrolyte is formed by using the injection solution which contains dimethyl carbonate.

9. A battery according to any of claims 1, 2 and 3, wherein the electrolyte is formed by using the injection solution which further contains $LiPF_6$.

10. A battery according to any of claims 1, 2 and 3, wherein the electrolyte is formed by using the injection solution which further contains $LiN(SO_2CF_3)_2$.

11. A battery according to any of claims 1, 2 and 3, wherein the electrolyte is formed by using the injection solution which further contains $LiN(SO_2C_2F_5)_2$.

12. A battery according to any of claims 1, 2 and 3, wherein the electrolyte is formed by using the injection solution which further contains $LiBF_4$.

13. A battery according to any of claims 1, 2 and 3, wherein the cathode, the anode, and the electrolyte are housed inside of a film exterior member.

* * * * *